(12) United States Patent  
Stern

(10) Patent No.: US 9,117,424 B2  
(45) Date of Patent: Aug. 25, 2015

(54) MULTILAYER ARTICLE THAT PROVIDES CUSHIONING

(71) Applicant: Albert Ivan Stern, Malibu, CA (US)

(72) Inventor: Albert Ivan Stern, Malibu, CA (US)

( * ) Notice: Subject to any disclaimer, the term of this patent is extended or adjusted under 35 U.S.C. 154(b) by 101 days.

(21) Appl. No.: 14/144,082

(22) Filed: Dec. 30, 2013

(65) Prior Publication Data

US 2015/0187342 A1 Jul. 2, 2015

Related U.S. Application Data

(60) Provisional application No. 61/720,061, filed on Oct. 30, 2012.

(51) Int. Cl.
| | |
|---|---|
| *G10D 3/18* | (2006.01) |
| *B32B 37/18* | (2006.01) |
| *B32B 37/12* | (2006.01) |
| *B32B 38/00* | (2006.01) |

(52) U.S. Cl.
CPC *G10D 3/18* (2013.01); *B32B 37/12* (2013.01); *B32B 37/18* (2013.01); *B32B 38/0004* (2013.01)

(58) Field of Classification Search
CPC .................................................... G10D 3/18
See application file for complete search history.

(56) References Cited

U.S. PATENT DOCUMENTS

| | | | | | |
|---|---|---|---|---|---|
| 1,296,414 | A | * | 3/1919 | McLay | 84/280 |
| 1,721,919 | A | * | 7/1929 | Meyers | 84/280 |
| 1,879,386 | A | * | 9/1932 | Medakovic | 84/280 |
| 2,216,052 | A | * | 9/1940 | Spetseris | 84/280 |
| 2,248,854 | A | * | 7/1941 | Coffeen et al. | 84/280 |
| 2,489,101 | A | * | 11/1949 | Mills | 84/280 |
| 3,479,916 | A | * | 11/1969 | Wolf | 84/280 |
| 3,631,754 | A | * | 1/1972 | Kun | 84/280 |
| 3,896,694 | A | * | 7/1975 | Goldner | 84/280 |
| 4,389,916 | A | * | 6/1983 | Ruthstrom | 84/278 |
| 5,507,213 | A | * | 4/1996 | Beseke | 84/280 |
| 5,883,315 | A | * | 3/1999 | Kaplan et al. | 84/279 |
| 6,239,337 | B1 | * | 5/2001 | Stein | 84/279 |

* cited by examiner

*Primary Examiner* — Robert W Horn
(74) *Attorney, Agent, or Firm* — Plager Schack LLP

(57) ABSTRACT

A multilayer article is configured to provide cushioning for a musical instrument. The multilayer article has an attachment layer configured to be detachably coupled to the musical instrument. An upper raised section layer is attached to the attachment layer and configured to be concave downward. A lower raised section layer attached to the attachment layer and configured to be concave upward. A center raised section layer attached to the attachment layer between the upper raised section layer and the lower raised section layer. The upper raised section layer, the lower raised section layer and the center raised section layer are arranged to ergonomically accommodate a clavicle of a human user.

6 Claims, 3 Drawing Sheets

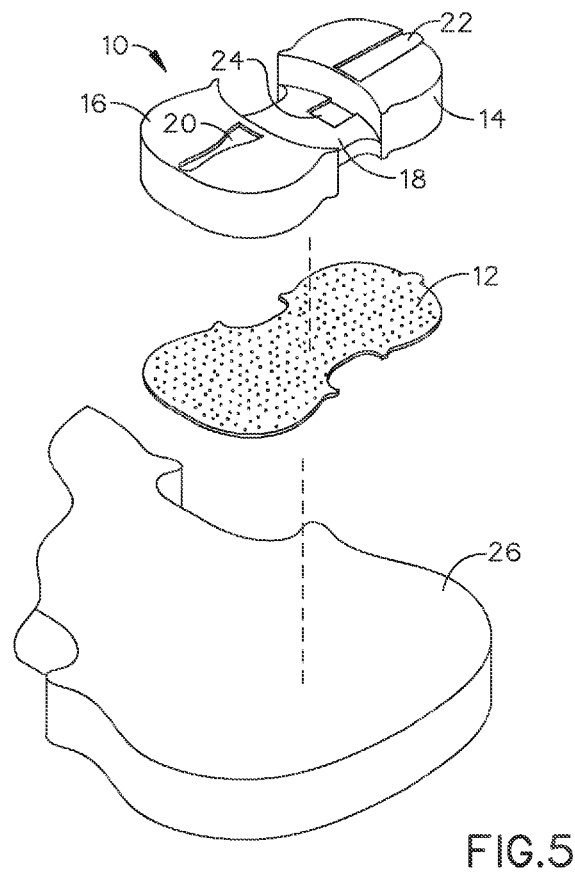
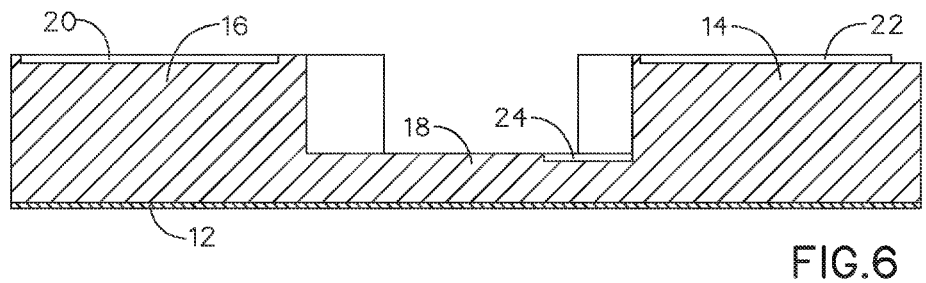

MULTILAYER ARTICLE THAT PROVIDES CUSHIONING

RELATED APPLICATION

This application claims priority to provisional patent application U.S. Ser. No. 61/720,061 filed on Oct. 30, 2012, the entire contents of which is herein incorporated by reference.

BACKGROUND

The embodiments herein relate generally to accessories for musical instruments or for other cushioning uses.

Prior to embodiments of the disclosed invention, there was no good solution to padding a musician's shoulder between the musician and an instrument. Pads and towels could fall off of the shoulder easily and can be unsightly. Clamping devices would affect the sound of an instrument adversely giving it a needlessly muted tone. Embodiments of the present invention solve these problems.

SUMMARY

A multilayer article is configured to provide cushioning for a musical instrument or associated devices. The multilayer article has an attachment layer configured to be detachably coupled to the musical instrument. An upper raised section layer is attached to the attachment layer and configured to be concave downward. A lower raised section layer attached to the attachment layer and configured to be concave upward. A center raised section layer attached to the attachment layer between the upper raised section layer and the lower raised section layer. The upper raised section layer, the lower raised section layer and the center raised section layer are arranged to ergonomically accommodate a clavicle of a human user or other body parts that make contact with the musical instrument.

In some embodiments, the upper raised section layer can have an upper raised section layer height. The lower raised section layer can have a lower raised section layer height. The center raised section layer can have a center raised section layer height. The center raised section layer height can be approximately half the upper raised section layer height and the lower raised section layer height to ergonomically accommodate the clavicle of the human user. In other embodiments the center raised section layer height can vary from the upper raised section layer height and the lower raised section layer height to ergonomically accommodate the preferences of the human user In some embodiments, the attachment layer can be made from an adhesive foam, configured to be detachably coupled to the musical instrument without affecting a sound from the musical instrument. The upper raised section layer, the lower raised section layer and the center raised section layer can be made from an acoustic foam or another suitable material, configured to ergonomically accommodate the clavicle of the human user to the musical instrument without affecting the sound of the musical instrument.

A process for making a multilayer article that provides cushioning for a musical instrument while not affecting a sound from the musical instrument contains the following steps which are not necessarily in order. First, affixing an adhesive foam to an acoustic foam forming a bonded base. Next, cutting the bonded base into an upper raised section layer, a lower raised section layer and a center raised section layer to ergonomically accommodate a clavicle of a human user. In some embodiments, the adhesive foam can be affixed to the acoustic foam by heating, utilizing an adhesive or any other effective technique the acoustic foam proximate the adhesive foam.

BRIEF DESCRIPTION OF THE FIGURES

The detailed description of some embodiments of the invention is made below with reference to the accompanying figures, wherein like numerals represent corresponding parts of the figures.

FIG. 5 is an exploded view of the invention
FIG. 6 is a section view of the invention, taken along line 4-4 in FIG. 3.

DETAILED DESCRIPTION OF CERTAIN EMBODIMENTS

Figure 1:
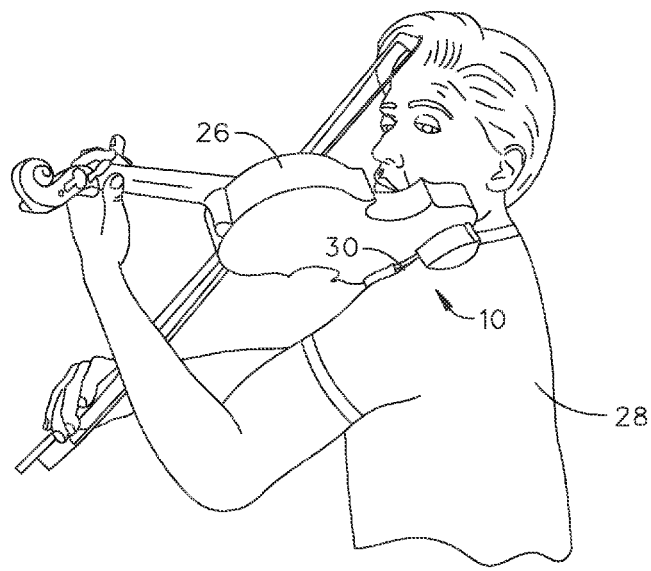
FIG. 1 is a perspective view of the invention, shown in use.

By way of example, and referring to FIG. 1, one embodiment of the present system comprises multilayer article 10. Multilayer article 10 is configured to fit immediately adjacent to musical instrument 26. Multilayer article 10 is configured to fit around clavicle 30 on human user 28.

Figure 2:
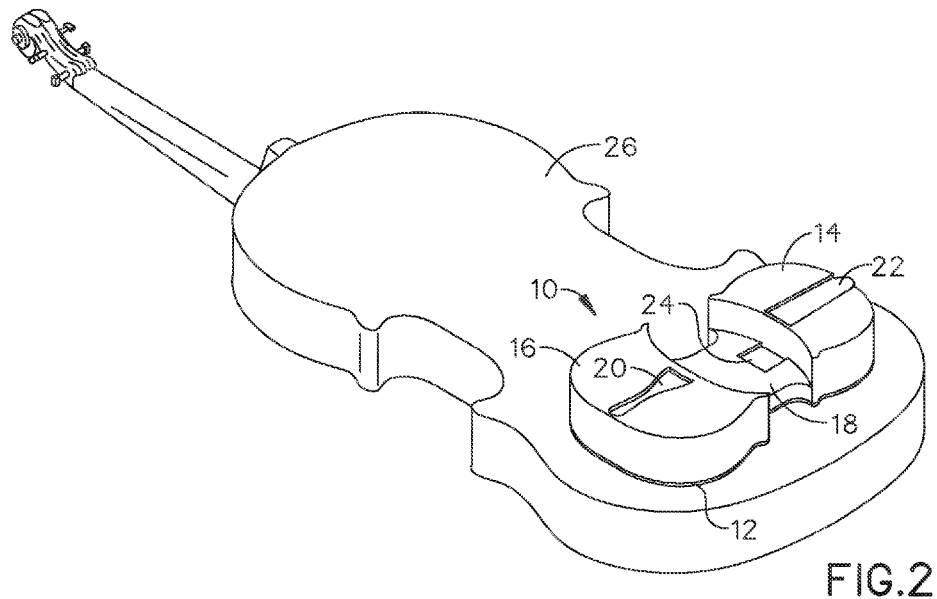
FIG. 2 is a perspective view of the invention.
Figure 3:
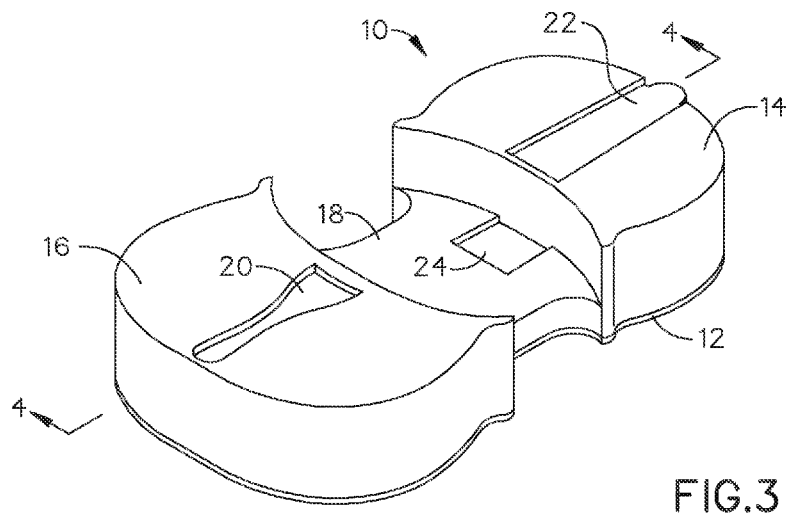
FIG. 3 is a perspective view of the invention.

Turning to FIG. 2 and FIG. 3, multilayer article 10 comprises attachment layer 12 mechanically coupled to upper raised section layer 14, lower raised section layer 16 and center raised section layer 18. Lower raised section layer 16 further comprises tail piece recess 20. Upper raised section layer 14 further comprises upper fingerboard recess 22. Center raised section layer 18 further comprises lower fingerboard recess 24.

Attachment layer 12 can be affixed to musical instrument 26 without the use of a clamp, strap or any other adhering device. This specialized gripping surface allows multilayer article 10 to be repeatedly attached and detached from musical instrument 26 without damaging a surface on musical instrument 26. While many materials could possibly meet these requirements, adhesive foam is preferred. The adhesive foam uses tiny micro suction cups immediately adjacent to musical instrument 26 to be readily attached to and detached from musical instrument 26.

The upper raised section layer 14, lower raised section layer 16 and center raised section layer 18 can be made from a variety of foams, plastics, fabrics, animal hides, wood, carbon fiber or other man made or natural products in single or multiple layers using known techniques. However, these materials should be arranged to ergonomically fit between clavicle 30 and musical instrument 26.

Preferably, upper raised section layer 14, lower raised section layer 16 and center raised section layer 18 can be made from an acoustic foam, which does not affect the sound of musical instrument 26 while padding clavicle 30. As used in this application, "acoustic foam" means an open celled foam used for acoustic treatment. This is contrasted with any other kind of foam that is closed celled. Acoustic foam attenuates airborne sound waves by increasing air resistance, thus reducing the amplitude of the waves. The energy is dissipated as heat. Acoustic foam can be made in several different colors, sizes and thickness. Collectively, upper raised section layer 14, lower raised section layer 16 and center raised section layer 18 are between about 4 and 8 inches in length, 3 and 5 inches in width, 1 and 3 inches in depth.

Figure 4:
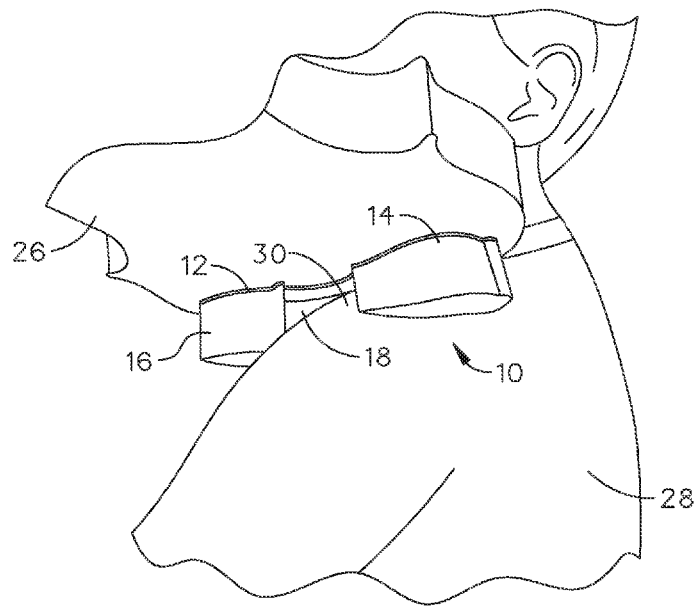
FIG. 4 is a perspective view of the invention, shown in use

Turning to FIG. 4, upper raised section layer 14, lower raised section layer 16 and center raised section layer 18 should be contoured to allow an ergonomic fit on clavicle 30. Sometimes, instrumentalists rest musical instrument 26 on their shoulder or at the lateral end of clavicle 30. Other instrumentalists will rest musical instrument 26 clavicle 30 and the chin of user 28. The shape of clavicle 30 varies widely from one user to another more than most other long bones. Clavicle 30 is occasionally pierced by a branch of the supraclavicular nerve. In males, clavicle 30 is thicker and more curved and the sites of muscular attachments are more pronounced. The right clavicle 30 is usually stronger and shorter than the left clavicle 30. In females, clavicle 30 is thinner, smoother and lighter than that of males.

These anatomical differences are accounted for in the following manner: upper raised section layer 14 is concave downward and has an upper raised section layer height. Lower raised section layer 16 is concave upward and has a lower raised section layer. Center raised section layer 18 has a center raised section layer height which is less than half the height of upper raised section layer height and the lower raised section layer height. Center raised section layer 18 has two concave sides and two convex sides. Slightly larger clavicles 30 can be accommodated with minor deformation of upper raised section layer 14 and lower raised section layer 16. Likewise, smaller and deeper clavicles can be accommodated between upper raised section layer 14 and lower raised section layer 16. Multilayer article 10 can be placed anywhere on musical instrument 26 with any orientation to provide comfort to the human user.

FIG. 5 and FIG. 6 offer one theory for assembling multilayer article 10. Attachment layer 12 is coupled to upper raised section layer 14, lower raised section layer 16 and center raised section layer 18 using a known process such as chemical bonding, heat bonding or any other known process. In some embodiments, adhesive foam is mechanically coupled to acoustic foam by heating the acoustic foam proximate the adhesive foam creating a bonded base. The bonded base can be cut into any ornamental shape or useful shape desired by the user provided that it keeps the ergonomic properties discussed above. This construction is not exclusive, and there may be many inner layers or many outer layers depending on the needs of the user.

In other embodiments, multilayer article 10 could be used on a cello to support a human user's knees. Additionally, multilayer article 10 could be used to support a user's wrists on a keyboard.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A multilayer article configured to provide cushioning for a musical instrument; the multilayer article comprising:
    an attachment layer configured to be detachably coupled to the musical instrument;
    an upper raised section layer attached to the attachment layer and configured to be concave downward;
    a lower raised section layer attached to the attachment layer and configured to be concave upward;
    a center raised section layer attached to the attachment layer between the upper raised section layer and the lower raised section layer;
    wherein the upper raised section layer, the lower raised section layer and the center raised section layer are arranged to ergonomically accommodate a clavicle of a human user.

2. The multilayer article of claim 1, wherein the upper raised section layer has an upper raised section layer height; the lower raised section layer has a lower raised section layer height; the center raised section layer has a center raised section layer height; wherein the center raised section layer height is approximately half the upper raised section layer height and the lower raised section layer height to ergonomically accommodate the clavicle of the human user.

3. The multilayer article of claim 1, wherein the attachment layer is made from an adhesive foam, configured to be detachably coupled to the musical instrument without affecting a sound from the musical instrument.

4. The multilayer article of claim 3, wherein the upper raised section layer, the lower raised section layer and the center raised section layer are made from an acoustic foam, configured to ergonomically accommodate the clavicle of the human user to the musical instrument without affecting the sound of the musical instrument.

5. A process for making a multilayer article that provides cushioning for a musical instrument while not affecting a sound from the musical instrument; the process comprising:
    affixing an adhesive foam to an acoustic foam forming a bonded base; and
    cutting the bonded base into an upper raised section layer, a lower raised section layer and a center raised section layer to ergonomically accommodate a clavicle of a human user.

6. The process of claim 5, wherein the adhesive foam is affixed to the acoustic foam by heating the acoustic foam proximate the adhesive foam.

* * * * *